(12) United States Patent
Nakamura et al.

(10) Patent No.: US 9,688,000 B2
(45) Date of Patent: Jun. 27, 2017

(54) PRODUCING METHOD OF CONCRETE

(75) Inventors: Seiji Nakamura, Tokyo (JP); Toru Sakai, Hokkaido (JP); Ryo Aoki, Tokyo (JP)

(73) Assignee: AIZAWA CONCRETE CORPORATION, Tomokomai-shi (JP)

( * ) Notice: Subject to any disclaimer, the term of this patent is extended or adjusted under 35 U.S.C. 154(b) by 4 days.

(21) Appl. No.: 14/415,376

(22) PCT Filed: Jul. 19, 2012

(86) PCT No.: PCT/JP2012/004591
§ 371 (c)(1),
(2), (4) Date: Jan. 16, 2015

(87) PCT Pub. No.: WO2014/013525
PCT Pub. Date: Jan. 23, 2014

(65) Prior Publication Data
US 2015/0202794 A1    Jul. 23, 2015

(30) Foreign Application Priority Data
Jul. 18, 2012    (JP) ................................. 2012-159135

(51) Int. Cl.
*B28C 5/00* (2006.01)
*B01F 3/12* (2006.01)
(Continued)

(52) U.S. Cl.
CPC ............ *B28C 5/003* (2013.01); *B01F 3/1214* (2013.01); *B01F 3/14* (2013.01); *B01F 13/10* (2013.01);
(Continued)

(58) Field of Classification Search
CPC ....................................................... B28C 5/003
(Continued)

(56) References Cited

U.S. PATENT DOCUMENTS 2,614,998 A * 10/1952 Lea ...................... C04B 24/2641
166/295
3,066,031 A * 11/1962 Schifferle ................. C04B 7/36
106/732
(Continued)

FOREIGN PATENT DOCUMENTS

JP    58-56815 A    4/1983
JP    63-94803 A    4/1988
(Continued)

OTHER PUBLICATIONS

International Search Report for PCT/JP2012/004591 dated Oct. 23, 2012.
(Continued)

*Primary Examiner* — David Sorkin
(74) *Attorney, Agent, or Firm* — Sughrue Mion, PLLC

(57) ABSTRACT

The present invention provides a producing method of concrete capable of appropriately controlling setting and hardening, and having excellent flexibility of production and handling of concrete. The producing method of concrete includes a cement paste mixing step and a concrete mixing step. In the cement paste mixing step, cement, mixing water and retarder are mixed together to obtain cement paste. According to this, setting and hardening of the cement paste are suppressed, and it is possible to store the cement paste for predetermined time. In the concrete mixing step, aggregate is input into the cement paste, and they are mixed together to obtain concrete. By the mixing operation, a setting-delaying effect is canceled.

2 Claims, 1 Drawing Sheet

(51) Int. Cl.
*B01F 3/14* (2006.01)
*B01F 13/10* (2006.01)
*C04B 40/00* (2006.01)
*C04B 40/06* (2006.01)

(52) U.S. Cl.
CPC .......... *C04B 40/0028* (2013.01); *C04B 40/06* (2013.01); *B01F 2013/1052* (2013.01); *B01F 2215/0047* (2013.01)

(58) Field of Classification Search
USPC ........................................................ 366/6, 8
See application file for complete search history.

(56) References Cited

U.S. PATENT DOCUMENTS

| 3,619,221 | A | * | 11/1971 | Kossivas | ................ | C04B 24/12 |
| | | | | | | 106/727 |
| 4,004,782 | A | * | 1/1977 | Jeppsen | ................ | B01F 9/0007 |
| | | | | | | 366/138 |
| 4,337,094 | A | * | 6/1982 | Tokar | .................... | C04B 24/001 |
| | | | | | | 106/713 |
| 4,431,310 | A | | 2/1984 | Ito et al. | | |
| 4,968,349 | A | | 11/1990 | Virtanen | | |

FOREIGN PATENT DOCUMENTS

| JP | 1-501789 A | 6/1989 |
| JP | 5-42527 A | 2/1993 |
| JP | 5-162118 A | 6/1993 |
| JP | 7-48156 A | 2/1995 |
| JP | 9-286651 A | 11/1997 |
| JP | 2864830 B2 | 3/1999 |
| JP | 4418847 B1 | 2/2010 |
| JP | 2010-149348 A | 7/2010 |
| WO | 2012/098626 A1 | 7/2012 |

OTHER PUBLICATIONS

Communication dated Feb. 24, 2016 from the European Patent Office in counterpart Application No. 12881489.4.

* cited by examiner

PRODUCING METHOD OF CONCRETE

CROSS REFERENCE TO RELATED APPLICATIONS

This application is a National Stage of International Application No. PCT/JP2012/004591 filed Jul. 19, 2012, claiming priority based on Japanese Patent Application No. 2012-159135 filed Jul. 18, 2012, the contents of all of which are incorporated herein by reference in their entirety.

TECHNICAL FIELD

The present invention relates to a producing method of concrete in which retarder is added and setting time is controlled.

BACKGROUND TECHNIQUE

Concrete is produced in such a manner that gravel, sand, cement and mixing water which are measured in accordance with predetermined composition are input into a mixer, and they are mixed for predetermined time. Various admixtures are added to the concrete produced in this manner. For example, water-reducing agent can reduce mixing water while securing flow property, and separation and reducing agent can reduce an amount of breeding. When it is desired to control setting and hardening time of concrete, retarder for delaying setting and hardening and promoter for promoting hardening are added. After concrete is produced, it is necessary to place the concrete within predetermined time, but if the setting and hardening time is adjusted, time constraint is reduced, and flexibility of producing and handling concrete is enhanced.

PRIOR ART DOCUMENT

Patent Document

Patent Document 1: Japanese Patent Application Laid-open No. 9-286651

Patent Document 1 describes a method of adjusting hardening time of cement. In the method described in Patent Document 1, when cement paste is obtained, retarder is added, setting is delayed by desired time and thereafter, predetermined promoter is added to harden the same. In this method, hydration reaction of cement is suppressed by the retarder, and a delay effect obtained by the retarder is canceled. That is, suppression of the hydration reaction is canceled.

SUMMARY OF THE INVENTION

Problem to be Solved by the Invention

Like the conventional method, and like the method described in Patent Document 1, if retarder is added, it is possible to suppress the setting and hardening of concrete, and if promoter is added and mixed when it is desired to eliminate the suppression, setting and hardening can be progressed. Therefore, it is possible to adjust the setting and hardening time, and flexibility of production and handling of concrete is relatively high. However, there are problems to be solved. More specifically, these methods require not only the retarder but also promoter, and there is a problem that costs are increased. As conventional methods, there is another method of adding and mixing cement without using promoter, and setting and hardening are promote, but additional cement is separately required. That is, the problem of cost is not solved. There is another problem to be solved. That is, it seems that there is room to further enhance the flexibility of production and handling. That is, according to the conventional method, retarder is added to mixing water when concrete is produced. That is, an object to which retarder is added is concrete of a final form, and it is absolutely necessary that a produce of a final form is produced in a batcher plant. For example, a semifinished product is produced in a batcher plant, and retarder is added to suppress the setting and hardening at this time and then, the semifinished product is conveyed to another place and concrete in the concrete of a final form is produced. According to this, flexibility of production and handling is further enhanced, but these points are not taken into consideration. Patent Document 1 describes a method of controlling the setting and hardening of cement paste instead of concrete, but in this document, the cement paste is merely a product of a final form. That is, all of steps for obtaining a product in a final form must be carried out in a batcher plant. According to this, it can not be said that the method described in Patent Document 1 has especially excellent flexibility of production and handling.

The present invention has been accomplished in view of such problems, and it is an object of the invention to provide a producing method of concrete capable of appropriately controlling setting and hardening although cost is low, and having enhanced flexibility of production and handling.

Means for Solving the Problems

The present inventors found that if aggregate is input to cement paste in which retarder is added and setting and hardening are suppressed and the cement paste and the aggregate are mixed, a setting-delaying effect obtained by retarder is canceled. The present invention has been accomplished based on this discovery. That is, to achieve the above object, the present invention is configured as follows. That is, the present invention is for producing concrete from cement, aggregate, mixing water and predetermined admixture, and configures a concrete producing method of producing including a cement paste mixing step and a concrete mixing step. In the cement paste mixing step, cement, mixing water and retarder are mixed to obtain cement paste. At this time, the mixing water may be divided into primary water and secondary water, the primary water and cement may be first mixed together to obtain intermediate cement paste and then, the secondary water and retarder may be input into the intermediate cement paste and they may be mixed together to obtain cement paste. In any case, the cement paste obtained by inputting and mixing retarder has suppressed setting and hardening, and the cement paste can be stored for predetermined time. The concrete mixing step configuring the present invention is a step of inputting aggregate into the cement paste to which such retarder is added, and mixing them together to obtain concrete. By this mixing operation, the setting-delaying effect obtained by retarder is canceled.

That is, a first aspect of the invention provides a producing method of concrete for producing concrete from cement, aggregate, mixing water and predetermined admixture, the method comprising: a cement paste mixing step of mixing the cement, the mixing water and retarder together to obtain cement paste; and a concrete mixing step of inputting the aggregate into the cement paste, and mixing them to obtain concrete, wherein a setting-delaying effect obtained by the retarder is canceled by the concrete mixing step.

According to a second aspect of the invention, in the method of the first aspect, the cement paste mixing step includes first and second cement paste mixing steps, in the first cement paste mixing step, all of the cement and primary water which is a portion of the mixing water are mixed together to obtain intermediate cement paste, and in the second cement paste mixing step, after the first cement paste mixing step, secondary water which is remnant of the mixing water and the retarder are input into the intermediate cement paste, the secondary water, the retarder and the intermediate cement paste are mixed together to obtain the cement paste.

According to a third aspect of the invention, in the method of the first or second aspect, at least the concrete mixing step is carried out in a mixer which is different from a mixer used in the cement paste mixing step.

Effect of the Invention

As described above, the invention provides a producing method of concrete for producing concrete from cement, aggregate, mixing water and predetermined admixture, and the method is composed of a cement paste mixing step and a concrete mixing step. In the cement paste mixing step, the cement, the mixing water and retarder are mixed together to obtain cement paste. Hence, setting and hardening of the obtained cement paste are suppressed. Therefore, the cement paste can be stored for predetermined time, and quality of the cement paste is not deteriorated. According to the present invention, in the concrete mixing step, aggregate is input into the cement paste, and they are mixed together to obtain concrete. By this concrete mixing step, a setting-delaying effect obtained by the retarder is canceled. That is, the aggregate is input into the cement paste which is stored without deteriorating quality of the cement paste by the setting-delaying effect, and the cement paste and the aggregate are mixed together to obtain concrete. A special promoter is not required for releasing the setting-delaying effect. Additional cement is also not required. Therefore, a producing cost of concrete can be reduced correspondingly. Since the cement paste can be stored for predetermined time, a batcher plant carries out only the cement paste mixing step to obtain cement paste, the produced cement paste is conveyed to a location in the vicinity of a concrete placing site, and when concrete becomes necessary, it is also possible to obtain concrete by carrying out the concrete mixing step. There is an effect that flexibility of production and handling of concrete is high. According to another aspect of the invention, the cement paste mixing step includes first and second cement paste mixing steps, in the first cement paste mixing step, all of the cement and primary water which is a portion of the mixing water are mixed together to obtain intermediate cement paste, and in the second cement paste mixing step, after the first cement paste mixing step, secondary water which is remnant of the mixing water and the retarder are input into the intermediate cement paste, the secondary water, the retarder and the intermediate cement paste are mixed together to obtain the cement paste. When cement paste is obtained, if mixing water is divided into the primary water and the secondary water, there is an effect that quality of concrete obtained by the subsequent concrete mixing step is enhanced. That is, although flow property of the obtained concrete, breeding is small.

MODE FOR CARRYING OUT THE INVENTION

Figure 1:
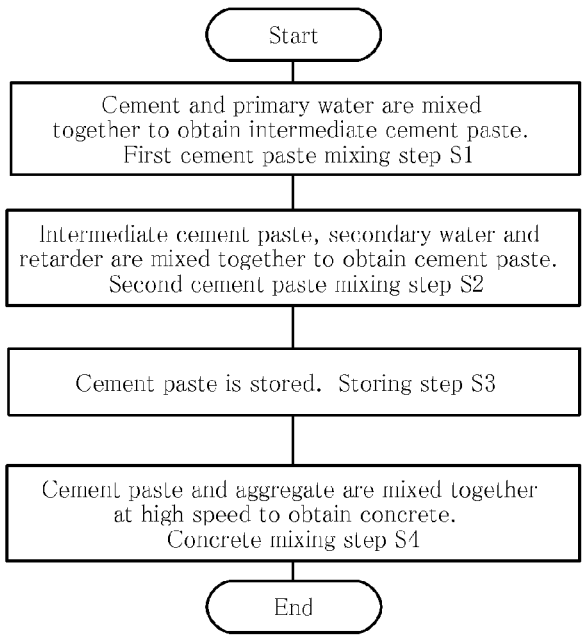
FIG. 1 is a flowchart showing a producing method of concrete according to an embodiment of the present invention.

An embodiment of the present invention will be described below. The producing method of concrete of the embodiment is for producing concrete from cement; mixing water; predetermined admixture; and aggregate such as sand gravel. Setting and hardening are controlled as described below. Therefore, retarder which suppresses setting and hardening is input. In the producing method of concrete according to the embodiment also, like the conventional method, a mixing operation is carried out using a mixer, but it is also possible to produce concrete only by a forcing mixer in a batcher plant, i.e., by a concrete-producing mixer, or by a combination of the concrete-producing mixer and a drum of an agitator truck. Alternatively, concrete can be produced by another mixer.

Generally, the producing method of concrete of the embodiment includes a cement paste mixing step of obtaining cement paste from cement and mixing water, and a concrete mixing step of obtaining concrete from this cement paste and aggregate. In the cement paste mixing step, cement and mixing water are input into a predetermined mixer to obtain cement paste. Retarder of a predetermined ratio with respect to weight of cement is added to the mixing water, and cement paste is obtained. There are various kinds of retarders. Examples of inorganic compound retarders which can be used are silicifluoride, boracic acid, phosphate, zinc oxide, lead oxide and copper oxide. Examples of organic compound retarders which can be used are gluconic acid, citric acid, oxycarboxylic acid and its chlorides such as glucoheptonate, keto acid and its chlorides such as 2-ketocarboxylic acid, polycarboxylic acid and its chlorides, aminosulfonic acid and its chlorides, sugar group and sugar alcohol, high molecular organic acid such as lignin sulfonic acid. Especially, oxycarboxylate, lignosulfonate and sugar group derivant are widely commercially-supplied, and these elements are used also in this embodiment. In the present invention, retarder suppresses hydration reaction of cement. That is, setting and hardening of cement paste are suppressed, and the cement paste can be stored for predetermined time in a state where its quantity is not deteriorated. The cement paste is stored until concrete becomes necessary. When concrete becomes necessary, the concrete mixing step is carried out. That is, cement paste and aggregate are input into a predetermined mixer and they are mixed. The mixing operation can be carried out by a barrel-inclined type mixer, a forcing mixer and other kinds of mixers such as a bread type mixer. By the mixing operation, hydration reaction of cement is started. It is expected that if chelate formed by cement particle is cut by a physical force, hydration reaction of cement is started. Or, it is estimated that by a physical force, retarder component which adheres to cement is separated from the cement, and hydration reaction of cement is started. In any case, it is possible to cancel the setting-delaying effect obtained by the retarder without requiring special promoter or additional cement, and concrete can be produced.

In the present invention, in the cement paste mixing step, mixing water may be input collectively, and the object of the invention can be achieved. That is, cement is brought into the state of cement paste, and the cement paste can be stored for predetermined time while suppressing the setting and hardening, and it is possible to cancel the setting-delaying effect by the concrete mixing step. Therefore, the object of the invention is achieved, and there is no problem as the producing method of concrete. However, in the producing method of concrete according to the embodiment which will be described below, the cement paste mixing step is divided into two steps, and these steps are concrete. According to this, flow property is enhanced, breeding is suppressed, and performance of concrete is enhanced.

The producing method of concrete according to the embodiment is configured as shown in FIG. 1. First, a first cement paste mixing step (step S1) is concrete. In the first cement paste mixing step, cement and primary water which is a portion of mixing water are input into a mixer, and they are mixed. An amount of the primary water is set to 20 to 32% of weight of cement, and the mixing operation is carried out for 30 to 90 seconds. By this step, intermediate cement paste is obtained, and cement in the intermediate cement paste is efficiently primarily nucleated by appropriate mixing water. The intermediate cement paste is statically left as it is for 30 to 90 seconds if necessary. Next, a second cement paste mixing step (step S2) is carried out. That is, secondary water which is remnant of the mixing water and retarder are input into the intermediate cement paste and they are mixed together. Any retarder can be used. When oxycarboxylate-based gluconic acid soda is used for example, retarder of not less than 0.13% weight with respect to weight of cement is input. More specifically, when retarder is solvent having 32% concentration, the solvent of not less than 0.40% weight is input, but the solvent is previously added into the secondary water and sufficiently dissolved. In the second cement paste mixing step, these elements are mixed together for 20 to 90 seconds to obtain cement paste. By dividing the mixing water into the primary mixing water and secondary mixing water and by carrying out the first and second cement paste mixing steps, cement is appropriately primarily nucleated, and finally produced concrete has high flow property and breeding becomes small.

Cement paste obtained in this manner can be stored for predetermined time by the setting-delaying effect of retarder without deteriorating its quality, and the cement paste can be stored from several hours to about 24 hours for example. A storing step (step S3) of storing cement paste for desired time is carried out. At this time, cement paste may be statically left as it is, or may be stirred by a mixer at low speed.

If concrete becomes necessary, a concrete mixing step (step S4) is carried out. More specifically, cement paste and aggregate are input into the mixer, and they are mixed to produce concrete. By mixing cement paste together with aggregate, concrete is obtained, and if they are further mixed together, hydration reaction of cement is started again. That is, the setting-delaying effect obtained by retarder is canceled. It was confirmed that if these elements were mixed for predetermined time, the setting-delaying effect was canceled and hydration of cement was started again irrespective of concentration of added retarder as will be described later in the embodiment. That is, the effect of the invention can be obtained. However, when the amount of added retarder is especially large, it is preferable that the mixing time is increased. More specifically, when the concrete mixing step is carried out using a drum of an agitator truck, it is preferable that mixing operation is carried out for 15 minutes or longer, or 20 minutes or longer. When the retarder is composed of gluconic acid soda and weight of added retarder is not less than 0.32% of weight of cement, i.e., when weight of added retarder solvent having 32% concentration is not less than 1% of weight of cement, if these elements are mixed together for 20 minutes or longer, strength of three days material age is high. It is expected that this is because chelate is sufficiently cut. Produced concrete is placed in a known manner.

Figure 2:
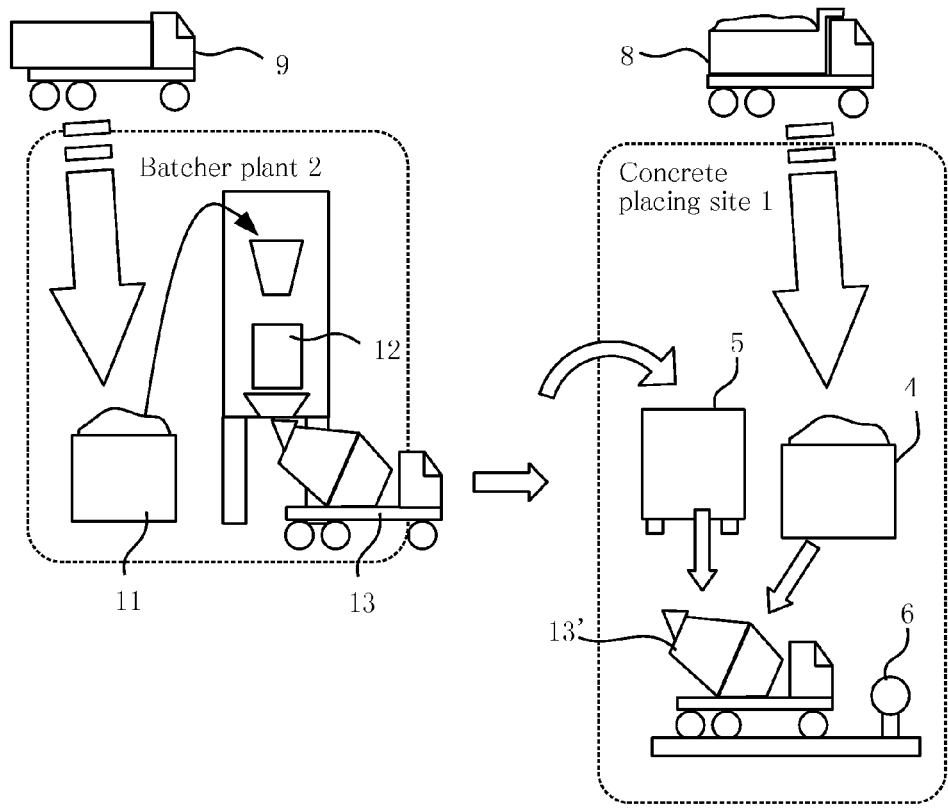
FIG. 2 is a schematic diagram for describing the producing method of con according to the embodiment of the invention.

It is also possible to carry out the first and second cement paste mixing steps (S1, S2) and the concrete mixing step (S4) at different sites and by different mixers, and such an embodiment is schematically shown in FIG. 2. In this embodiment, an aggregate storage space 4, a cement paste reserving tank 5 and a load cell 6 are previously installed in the vicinity of a concrete placing site 1. Aggregates such as sand, gravel and crushed stone are conveyed by a dump truck 8, and the aggregates are stored in the aggregate storage space 4. On the other hand, only cement is conveyed to a batcher plant 2 by a cement guided vehicle 9 such as a tank lorry, and the cement is stored in a cement reserving tank 11. The batcher plant 2 is provided with a concrete producing mixer 12. In the concrete producing mixer 12, cement paste is produced from mixing water, retarder and cement conveyed from the cement reserving tank 11. That is, the first and second cement paste mixing steps (S1, S2) are carried out in the concrete producing mixer 12. The obtained cement paste is loaded into a drum of an agitator truck 13, and is conveyed to the concrete placing site 1 while stirring the cement paste slowly.

The cement paste is unloaded from the drum of the agitator truck 13 into the cement paste reserving tank 5. Next, cement paste of predetermined weight is input into the drum of agitator truck 13' from the cement paste reserving tank 5. The weight is precisely measured by the load cell 6. Alternatively, the following operation may be carried out. That is, when secondary cement paste is unloaded from the drum of the agitator truck 13, secondary cement paste of predetermined weight is left in the drum. In this case also, the secondary cement paste of precise weight is left in the drum by the load cell 6. Aggregate of predetermined weight is input into the drum of the agitator truck 13' from the aggregate storage space 4. Similarly, the weight of the aggregate is precisely measured by the load cell 6. The drum is rotated at high speed. That is, the concrete mixing step (S4) is carried out to produce concrete. The produced concrete is unloaded and the concrete is placed. Similarly, cement paste of predetermined weight is input into the drum of the empty agitator truck 13' from the cement paste reserving tank 5 and aggregate of predetermined weight is input into the drum of the agitator truck 13' from the aggregate storage space 4, the drum is rotated at high speed, the concrete mixing step (S4) is carried out and concrete is produced.

EXAMPLE 1

An experiment was carried out to confirm that setting and hardening could be controlled by the producing method of concrete according to the present invention and the setting-delaying effect obtained by retarder could be canceled by physical working caused by mixing action.

(1) Common Conditions

When concrete was produced while variously changing conditions, conditions of materials other than retarder were common. That is, material to be used and ratios thereof were set constant as follows.

TABLE 1

|  | Mixing water | Cement | fine aggre-gate | Coarse aggre-gate | AE water-reducing agent | AE adjuvant |
|---|---|---|---|---|---|---|
| Material weight (kg) of concrete 1 m$^3$ | 167 | 361 | 889 | 937 | 3.61 | 0.014 |

Note:
Surface water is not included in weight of aggregate.

TABLE 2

|  | Mixing water | Cement | fine aggre-gate | Coarse aggre-gate | AE water-reducing agent | AE adjuvant |
|---|---|---|---|---|---|---|
| Material weight (kg) of concrete 40 L | 5.97 | 14.43 | 36.27 | 37.48 | 0.14 | 0.0006 |

Note:
Surface water of 2% is included in weight of aggregate. Mixing water reduces surface moisture.

Table 1 shows weights (kg) of materials when concrete of 1 m$^3$ is produced, and weights of fine aggregate and coarse aggregate are value when these aggregates are dry and do not include surface water. In accordance with the ratios shown in Table 1, experimental concrete of 40 L was produced in the experiment. Table 2 shows weights of materials when concrete of 40 L is produced. The fine aggregate includes 2% surface water by weight. Therefore, the surface moisture is subtracted from the weight of mixing water. A general AE water-reducing agent was used, this was added to obtain the water-reducing effect. The AE adjuvant was added to enhance flow property and workability by air entrainment. Therefore, these elements do not facilitate or delay setting and hardening of cement. The experiment was carried out at mixing water temperature of 12° C. and average air temperature of 18° C.

The mixer used in the experiment was a barrel-inclined type mixer having the maximum diameter of 65 cm, and the mixer was rotated such that the peripheral speed at the time of the mixing operation was 1 m per second.

(2) Production of Experimental Concrete

Experimental concretes A1 to F1 were produced while variously changing conditions.

TABLE 3

|  |  | Retarder of 32% concen-tration (kg) | Adding ratio of retarder with respect to cement weight (32% concentration) | Rate of retarder weight with respect to cement weight | Mixing water when cement paste is mixed | Mixing time of cement paste and aggregate | Compression strength of 3rd day material age | Compression strength of 28th day material age |
|---|---|---|---|---|---|---|---|---|
| A | A1 | 0.0577 | 0.40% | 0.13% | Collectively input | 5 minutes | — | 23.5 |
|   | A2 |  |  |  |  | 10 minutes | 12.9 | 33.1 |
| B | B1 | 0.101 | 0.70% | 0.22% | Collectively input | 5 minutes | — | 21.8 |
|   | B2 |  |  |  |  | 10 minutes | 11.8 | 35.0 |
| C | C1 | 0.0577 | 0.40% | 0.13% | Divided into primary water and secondary water | 10 minutes | 12.9 | 33.1 |
|   | C2 |  |  |  |  | 20 minutes | 15.1 | 36.4 |
|   | C3 |  |  |  |  | 30 minutes | 17.3 | 40.3 |
| D | D1 | 0.101 | 0.70% | 0.22% | Divided into primary water and secondary water | 10 minutes | 11.8 | 35.0 |
|   | D2 |  |  |  |  | 20 minutes | 14.0 | 38.6 |
|   | D3 |  |  |  |  | 30 minutes | 16.2 | 42.1 |
| E | E1 | 0.144 | 1.00% | 0.32% | Divided into primary water and secondary water | 10 minutes | 8.5 | 34.7 |
|   | E2 |  |  |  |  | 20 minutes | 13.1 | 37.1 |
|   | E3 |  |  |  |  | 30 minutes | 18.4 | 41.7 |
| F | F1 | 0 | 0% | 0% | — | — | 14.1 | 36.9 |

When experimental concretes A1, A2 ... F1 were mixed, they were produced as shown in Table 3, and details of each of items were as follows.

(a) Concerning Presence or Absence of Production of Cement Paste and Storage of Cement Paste In each of groups A to E, cement paste was obtained, it was gently stirred for 24 hours and it was stored and then, aggregate was input thereto and concrete was obtained. On the other hand, in group F, materials were collectively input and they were mixed and concrete was obtained. That is, in group F, cement paste was not produced.

(b) Concerning Retarder

In groups A to E, when cement paste was obtained, mixing water was added to retarder. As retarder, gluconic acid soda was used. On the other hand, retarder was not added in group F. In each of groups A and C, retarder was added such that weight of retarder became 0.13% with respect to weight of cement. In each of groups B and D, retarder was added such that weight of retarder became 0.22% with respect to weight of cement. In group E, retarder was added such that weight of retarder became 0.32% with respect to weight of cement.

In reality, retarder solvent having concentration of 32% was produced, and it was added to mixing water. Therefore, weight of retarder solvent was 0.40% in groups A and C with respect to weight of concrete, weight of retarder solvent was 0.70% in groups B and D with respect to weight of concrete, and weight of retarder solvent was 1.00% in group E with respect to weight of concrete.

(c) Concerning Division of Mixing Water when Cement Paste is Produced.

In groups A and B, when cement paste was produced, mixing water was collectively input and cement paste was obtained. On the other hand, in groups C to E, mixing water was divided, primary water was 4.04 kg, secondary water was 1.93 kg, and cement paste was produced by the first and second cement paste mixing steps. The first cement paste mixing step was 90 seconds, the second cement paste mixing step was 20 seconds, and intermediate cement paste was left as it was for 30 seconds between these two steps.

(d) Mixing Time of Mixer when Concrete is Mixed

In A1 and B1, when concrete was produced from cement paste and aggregate, the mixing operation was carried out by rotating the mixer for 5 minutes. On the other hand, in A2, B2 and groups C to E, the mixing operation was carried out by rotating the mixer for 10 minutes or longer. In A2, B2, C1, D1 and E1, the mixing operation was carried out for 10 minutes. In C2, D2 and E2, the mixing operation was carried out for 20 minutes. In C3, D3 and E3, the mixing operation was carried out for 30 minutes.

(3) Results and Consideration of Experiment (a) Concerning Compression Strength

Test pieces for measuring compression strength were produced for the experimental concretes of A1 to F1, and compression strength (N/mm2) of 3rd day material age and 28th day material age were measured. Results of the measurement are as shown in Table 3. In A1 and B1, since setting could not be found in 3rd day, compression strength of 3rd day material age could not be measured.

From this result, it could be confirmed that in A1 and B1, the setting-delaying effect obtained by retarder was not canceled and setting did not occur in 3rd day, in A2, B2 and groups C to E, setting occurred in 3rd day, and the concrete was hardened at predetermined hardness. In 28th day material age, strength of each of A1 and B1 was low, but in A2, B2 and groups C to E, strengths were obtained. According to this, it could be confirmed that in the case of cement paste in which retarder was included and setting and hardening were suppressed, if aggregate was input and the cement paste and aggregate were mixed for more than 10 minutes, the delaying effect was canceled.

Concerning group E in which a large amount of retarder was input, E1 in which elements were mixed only for 10 minutes in the concrete producing step, the effect of the present invention that the delaying effect was canceled could be confirmed, but the strength of 3rd day material age was not necessarily sufficient. When concrete is provided as product, it is preferable that the mixing operation is carried out for 20 minutes or longer as in E2 and E3.

In each of C2, C3, D2, D3, E2 and E3, the elements were mixed for 20 minutes or longer in the concrete producing step, and they had higher compression strength than F1.

(b) Concrete Properties when Concrete is Produced

Concerning each of groups A to E, an air amount and a slump value when concrete was produced were measured, and results were as follows.

Air amounts of A1 and A2 were 5.5 and 6.2, respectively, and slump values of A1 and A2 were 17.0 and 18.0, respectively. The slump value of A2 was greater than that of A1.

Air amounts of B1 and B2 were 5.6 and 6.4, respectively, and slump values of B1 and B2 were 19.5 and 21.0, respectively. The slump value of B2 was greater than that of B1.

Air amounts of C1, C2 and C3 were 6.2, 5.0 and 4.0, respectively. Slump values of C1, C2 and C3 were 18.0, 14.0 and 11.0, respectively. C1 had the largest slump value. The longer the mixing time in the concrete mixing step (step S4) was, the smaller the slump value was. Reduction in the slump value was small as compared with a slump loss which was generally expected from such mixing time, and the reduction in the slump value was permissible range. C2 and C3 were dug by a scoop, and they were softer than expected from the slump values.

Air amount of D1, D2 and D3 were 6.4, 5.4 and 4.4, and slump values thereof were 21.0, 19.5 and 17.0, respectively. D1 has the largest slump value. D1 had slight material separating tendency, but D2 and D3 did not have separating tendency and had excellent states.

Air amounts of E1, E2 and E3 were 7.0, 6.2 and 5.0, and slump values thereof were 23.0, 21.0 and 19.5, respectively. E1 had the largest slump value. E1 had slight material separating tendency, but E2 and E3 did not have separating tendency and had excellent states.

EXAMPLE 2

If a kind of the mixer is changed, mixing time required for producing concrete is largely changed. An experiment was carried out to confirm that the effect of the present invention could be obtained even if the kind of the mixer was changed and time of the concrete mixing step was changed.

(1) Common Conditions

When concrete was produced while variously changing conditions, material to be used and its ratio were constant, and details were as follows.

TABLE 4

| | Mixing water | Cement | fine aggregate | Coarse aggregate | AE water-reducing agent | AE adjuvant |
|---|---|---|---|---|---|---|
| Material weight (kg) of concrete 1 m³ | 167 | 361 | 831 | 1023 | 3.61 | 0.0325 |

Note:
Surface water is not included in weight of aggregate.

TABLE 5

| | Mixing water | Cement | fine aggregate | Coarse aggregate | AE water-reducing agent | AE adjuvant |
|---|---|---|---|---|---|---|
| Material weight (kg) of concrete 1.5 m³ | 191 | 541 | 1306 | 1534 | 5.42 | 0.0487 |

Note:
Surface water of 4.8% is included in weight of aggregate. Mixing water reduces surface moisture.

Table 4 shows weights (kg) of materials when concrete of 1 m³ is produced, and weights of fine aggregate and coarse aggregate are value when these aggregates are dry and do not include surface water. In the experiment, concrete of 1.5 m³ was produced in accordance with the ratio shown in Table 4. Weights of materials when concrete of 1.5 m³ is produced are shown in Table 5. Fine aggregate includes surface water of 4.8% by weight. Therefore, the surface moisture is subtracted from the weight of mixing water.

(2) Production of Experimental Concrete

Experimental concretes J1 to K1 were produced in the following manner.

TABLE 6

| | | Retarder of 32% concentration (kg) | Adding ratio of retarder with respect to cement weight (32% concentration) | Rate of retarder weight with respect to cement weight | Mixing water when cement paste is mixed | Mixing time of cement paste and aggregate | Compression strength of 3rd day material age | Compression strength of 28th day material age |
|---|---|---|---|---|---|---|---|---|
| J | J1 | 0.75 | 0.44% | 0.14 | Collectively input | 4 minutes 30 seconds | — | 26 |
|   | J2 |   |   |   |   | 9 minutes | 10.6 | 35.2 |
|   | J3 |   |   |   |   | 18 minutes | 13.6 | 38.7 |
|   | J4 |   |   |   |   | 27 minutes | 17.7 | 41 |
| K | K1 |   |   |   |   | 30 seconds | — | 25.3 |
|   | K2 |   |   |   |   | 60 seconds | 12.4 | 39.3 |
|   | K3 |   |   |   |   | 90 seconds | 14.3 | 41.9 |
|   | K4 |   |   |   |   | 120 seconds | 18.3 | 44.3 |

(a) Production of Cement Paste

In groups J and K, mixing water and cement were collectively input, they were mixed for 90 seconds, cement paste was obtained, and cement paste was stored in this state for 24 hours. Gluconic acid soda was added to mixing water as retarder as shown in Table 6.

(b) Group J

In group J, cement paste which was stored for 24 hours was input into a drum of an agitator truck vehicle together with aggregate and they were mixed. At this time, the drum of the agitator truck was rotated by so-called high speed stirring. J1 to J4 were mixed for time shown in Table 6.

(c) Group K

In group K, cement paste which was stored for 24 hours was input into a forcing mixer together with aggregate and they were mixed. K1 to K4 were mixed for time shown in Table 6.

(3) Results and Consideration of Experiment (a) Concerning Compression Strength

Test pieces for measuring compression strength were produced for the experimental concretes of J1 to K4, and compression strength (N/mm2) of 3rd day material age and 28th day material age were measured. Results of the measurement are as shown in Table 6. In J1 and K1, since setting could not be found in 3rd day, compression strength of 3rd day material age could not be measured.

From this result, it could be confirmed that in J1 and K1, the setting-delaying effect obtained by retarder was not canceled and setting did not occur in 3rd day, in J2 to J4 and K2 to K4, setting occurred in 3rd day, and the concrete was hardened at predetermined hardness. In 28th day material age, strength of each of J1 and K1 was low, but in J2 to J4 and K2 to K4, strengths were obtained.

(b) Concrete Properties when Concrete is Produced

Concerning each of groups J and K, an air amount and a slump value when concrete was produced were measured, and results were as follows.

Air amount of J1 to J4 were 5.8, 5.2, 4.8 and 3.8, respectively. Slump values of J1 to J4 were 17.5, 18.5, 18.0 and 17.0, respectively. It was found that in experimental concretes after J2 in which the slump values were the largest, i.e., in J2 to J4, the delaying effect obtained by the retarder was canceled.

Air amount of K1 to K4 were 4.9, 4.8, 4.6 and 4.3, respectively. Slump values of K1 to K4 were 17.5, 19.0, 18.5 and 17.5, respectively. It was found that in experimental concretes after K2 in which the slump values were the largest, i.e., in K2 to K4, the delaying effect obtained by the retarder was canceled.

EXPLANATION OF SYMBOLS 1 concrete placing site
2 batcher plant
4 aggregate storage space
5 cement paste reserving tank
6 load cell
8 dump truck
9 cement guided vehicle
11 cement reserving tank
12 concrete producing mixer
13 agitator truck

The invention claimed is:

1. A producing method of concrete for producing concrete from cement, aggregate, mixing water and predetermined admixture, the method comprising:
   a cement paste mixing step of mixing the cement, the mixing water and retarder together to obtain cement paste; and
   a concrete mixing step of putting contents consisting of the cement paste and the aggregate into a drum of an agitator truck, and mixing the cement paste and aggregate for nine minutes or longer by high speed stirring to obtain concrete, wherein
   a setting-delaying effect obtained by the retarder is canceled by the concrete mixing step.

2. The method according to claim 1, wherein
   the cement paste mixing step includes first and second cement paste mixing steps,
   in the first cement paste mixing step, all of the cement and primary water which is a portion of the mixing water are mixed together to obtain intermediate cement paste, and
   in the second cement paste mixing step, after the first cement paste mixing step, secondary water which is remnant of the mixing water and the retarder are input into the intermediate cement paste, the secondary water, the retarder and the intermediate cement paste are mixed together to obtain the cement paste.

* * * * *